United States Patent [19]

Nagano

[11] Patent Number: 4,628,769
[45] Date of Patent: Dec. 16, 1986

[54] SPEED CHANGE HUB FOR A BICYCLE

[75] Inventor: Masashi Nagano, Izumi, Japan

[73] Assignee: Shimano Industrial Company Limited, Osaka, Japan

[21] Appl. No.: 675,616

[22] Filed: Nov. 28, 1984

[30] Foreign Application Priority Data

Nov. 29, 1983 [JP] Japan ................................ 58-225844

[51] Int. Cl.⁴ ............................................. F16H 3/44
[52] U.S. Cl. .................................. 74/750 B; 74/781 B
[58] Field of Search ........................... 74/750 B, 781 B

[56] References Cited

U.S. PATENT DOCUMENTS 3,057,227 10/1962 Schwerdhofer .................. 74/750 B
3,172,305 3/1965 Schwerdhofer .................. 74/750 B
3,828,627 8/1974 Schwerdhofer .................. 74/750 B
4,069,725 1/1978 Segawa ............................. 74/781 B

FOREIGN PATENT DOCUMENTS 2413957 9/1974 Fed. Rep. of Germany .
2937126 4/1980 Fed. Rep. of Germany .

Primary Examiner—Lawrence Staab
Assistant Examiner—Martin G. Belisario
Attorney, Agent, or Firm—Stevens, Davis, Miller & Mosher

[57] ABSTRACT

A speed change hub for a bicycle includes a driving member, a ring gear rotatable in association with the driving member and having first transmitting members for transmitting a driving force to a hub shell, and a gear frame having planetary gears engageable with inner teeth of the ring gear. The hub also includes a sun gear disposed on a hub shell and having second transmitting members for transmitting the driving force to the hub shell, and a relay member rotatable in association with the driving member. The relay member includes third transmitting members for transmitting the driving force to the gear frame, is supported axially slidably to the hub shaft, and has a first clutch for controlling the first transmitting members to engage or disengage from the hub shell. The hub shaft axially slidably supports an actuator in operative engagement with an operating rod and has a second clutch for controlling the third transmitting members to engage or disengage from a gear frame. A transmitting member for transmitting sliding motion of the actuator to the relay member after the second clutch disengages the third transmitting members is provided between the actuator and the relay member, so that the relay member is caused to slide after the third transmitting members disengage, thereby disengaging the first transmitting members from the hub shell by operation of the first clutch.

2 Claims, 4 Drawing Figures

SPEED CHANGE HUB FOR A BICYCLE

FIELD OF THE INVENTION

This invention relates to a speed change hub for a bicycle, and more particularly to a speed change hub for a bicycle which transmits a driving force from a driving member driven by pedalling to a hub shell supporting a rear wheel, this driving force being transmitted through a speed change gear mechanism having first, second and third transmitting members, the three transmitting members being controlled to engage with or disengage from the hub shell to thereby increase or decrease the bicycle speed.

BACKGROUND OF THE INVENTION

Generally, bicycle speed change hubs are so constructed that a hub shell and a driving member having a sprocket wheel for engaging a drive chain are supported rotatably on a hub shaft fixed to the bicycle frame. The hub shell houses a speed change gear mechanism provided with a sun gear mounted to the hub shell; a ring gear rotatable in association with the driving member and having first transmitting members engageable with the hub shell; a gear frame having planetary gears in mesh with inner teeth of the ring gear and the sun gear and having second transmitting members engageable with the hub shell; and a relay member rotatable in association with the driving member, having third transmitting members engageable with the gear frame, supported axially slidably to the hub shaft, and having clutch means to control the first transmitting members to engage with or disengage from the hub shell. The hub shell slidably supports an operating rod which is operated to axially slide the relay member, so that the first or third transmitting members are controlled to engage with or disengage from the hub shell, thereby transmitting the driving force thereto at high or low speed or directly.

For the high speed mode, the first transmitting members engage with inner teeth at the hub shell and the third transmitting members engage with inner teeth at the gear frame, thereby transmitting the driving force from the driving member to the hub shell through the relay member, third transmitting members, gear frame, planetary gears, ring gear and first transmitting members. In a case where the bicycle is switched from the high speed mode to the middle speed mode, the relay member is actuated to release the first transmitting members from the hub shell, thereby transmitting the driving force from the driving member to the hub shell through the relay member, third transmitting members, gear frame and second transmitting members. In a case of switching from the middle speed mode to the low speed mode, the relay member is further actuated to disengage the third transmitting members from the ring gear while keeping the first transmitting members disengaged from the hub shell, thereby transmitting the driving force to the hub shell through the ring gear, planetary gears, gear frame and second transmitting members.

However, when the bicycle is switched from the high speed mode to the low speed mode, the relay member is subjected to a load transmitted from the rear wheel to the hub shell through the third transmitting members, whereby a sliding resistance of the relay member is very great. As a result, an extremely intense operating force is required, thereby resulting in diminished speed change efficiency.

SUMMARY OF THE INVENTION

In order to solve the above problem, this invention has been designed. An object of the invention is to provide a speed change hub for a bicycle, which is provided with an actuator having a second clutch separate from the clutch for controlling the first transmitting members, so that the second clutch controls the third transmitting members to disengage from the gear frame and thereafter the first clutch disengages the first transmitting members from the hub shell. As a result when the high speed mode is switched to the low speed mode, a resistance against operation of the relay member is reduced thus facilitating the speed change due to the small operating force required.

In other words, the actuator associates or operatively engages with an operating rod for actuating the relay member, a second clutch for engaging or disengaging the third transmitting members relative to the gear frame is provided at the actuator, and between the actuator and the relay member is provided a transmitting means to transmit sliding motion of the actuator to the relay member after the second clutch disengages the third transmitting members, so that after the third transmitting members disengage, the relay member slides to allow the first clutch to disengage the first transmitting members from the hub shell.

Hence, when the high speed mode is switched to the low speed mode, the second clutch at first disengages the third transmitting members from the gear frame so that the driving force is not transmitted from the driving member to the hub shell through the relay member and the third transmitting members, and the relay member is caused to slide to allow the first clutch to disengage the first transmitting members from the hub shell, whereby the speed change from high speed to low speed is ensured by use of a small operating force, thus improving the speed change efficiency. Also, the sliding resistance of the relay member is reduced, thus enabling the construction of the first clutch to be simplified.

The above and further objects and novel features of the invention will be more fully apparent from the following detailed description when the same is read in connection with the accompanying drawings.

DETAILED DESCRIPTION OF THE INVENTION

Figure 1:
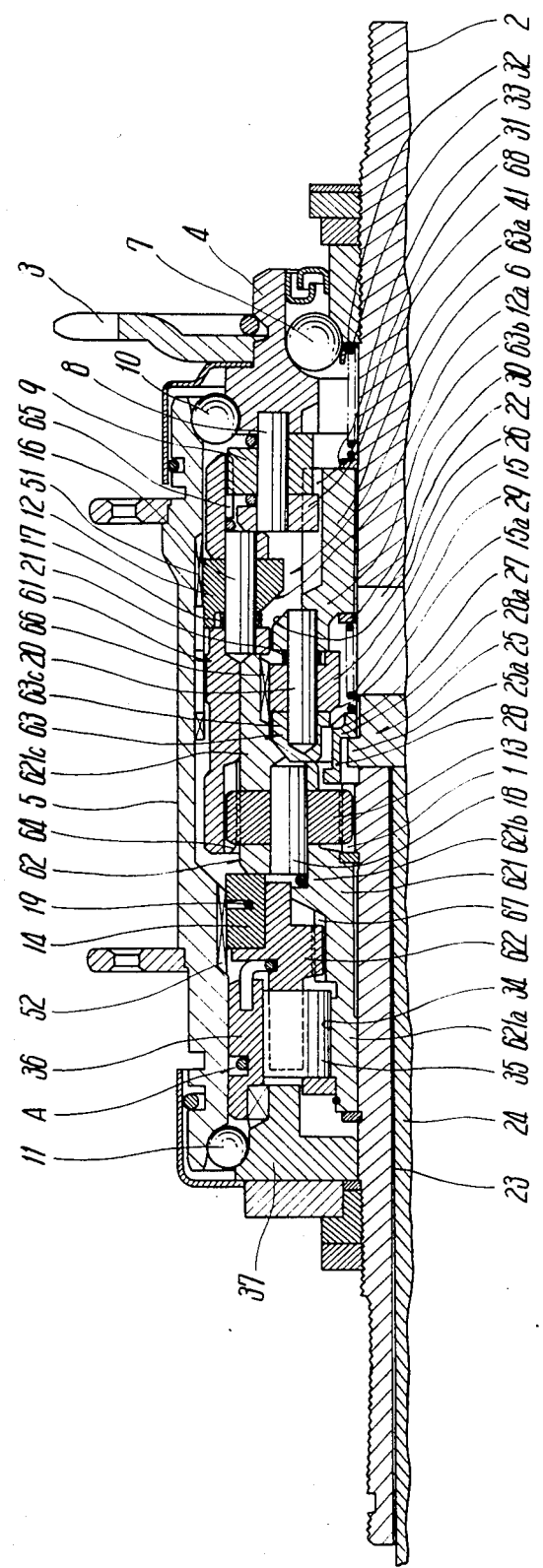
FIG. 1 is a partially omitted longitudinal sectional front view of an embodiment of a speed change hub of the invention.

Referring to the drawings, a speed change hub to be switched between three stages of high, middle and low speeds is shown. The hub comprises a hub shaft 2 fixed to the bicycle frame and having a sun gear 1 at the outer periphery of a lengthwise intermediate portion thereof, a cylindrical driving member 4 supported rotatably to the hub shaft 2 and provided at its outer periphery with a chain gear 3, a hub shell 5 supported rotatably with respect to the driving member 4 and hub shaft 2, a speed change gear mechanism 6 housed in the hub shell 5 and changing the driving force and transmitting it to the hub shell 5, and a speed changing means for operating the speed change gear mechanism 6.

In detail, the cylindrical driving member 4 supports at the outer periphery of one axial end thereof the chain gear 3 and is supported at this one axial end rotatably to the hub shaft 2 through a bearing 7. Driving member 4 pivotally supports at its other axial end transmitting pawls 9 through pivot shafts 8 respectively, and provides splines 41 at its inner periphery at the transmitting pawl side.

The hub shell 5 is supported at one axial end rotatably to the outer periphery of driving member 4 through a bearing 10 and at its other axial end rotatably to the hub shaft 2 through a bearing 11. Hub shell 5 includes at the inner peripheries of both its ends first and second ratchet teeth 51 and 52.

The speed change gear mechanism 6 housed in the hub shell 5 comprises the sun gear 1, a ring gear 61 rotatable in association with the driving member 4 and having first transmitting members 12 engageable with the first ratchet teeth 51 at the hub shell 5, a cylindrical gear frame 62 having planetary gears 13 in mesh with the sun gear 1 and inner teeth 64 at the inner periphery of one axial end of ring gear 61 and having second transmitting members 14 engageable with the second ratchet teeth 52, and a cylindrical relay member 63 rotatable in association with the driving member 4. Relay member 63 has third transmitting members 15 for transmitting the driving force from the driving member 4 to the gear frame 62 and is supported slidably to the hub shaft 2. The ring gear 61 has a slightly smaller outer diameter than an inner diameter of hub shell 5, is cylindrical and extends between the transmitting pawls 9 at the driving member 4 and the planetary gears 13 at the gear frame 62. Ring gear 61 includes at the inner periphery of one of its axial ends located at the driving member 4 side thereof inner teeth 65 engageable with the transmitting pawls 9. Inner teeth 65 and transmitting pawls 9 constitute a unidirectional rotary transmission for transmitting the driving force to the ring gear 61 only when the driving member 4 normally rotates. The inner teeth 64 are provided at the inner periphery of the other axial end of ring gear 61 and the first transmitting members 12 are pivoted to an axially intermediate portion of the same through pivot pins 16. First transmitting members 12 are biased toward the first ratchet teeth 51 by a spring 17.

The gear frame 62 comprises a first cylinder 621 supporting the planetary gears 13 and a second cylinder 622 supporting the second transmitting members 14. The first cylinder 621 comprises a smaller diameter cylinder 621a supported rotatably to the hub shaft 2 and a larger diameter cylinder 621c extending axially from one axial end of cylinder 621a toward the driving member 4 through a stepped portion 621b. The larger diameter cylinder 621c is disposed in the ring gear 61, rotatably supports at the stepped portion 621b side the planetary gears 13 through pivot shafts 18, and provides at the inner periphery of its utmost end inner teeth 66 engageable with the third transmitting members 15. The second cylinder 622 is supported at the outer periphery of smaller diameter cylinder 621a of first cylinder 621 at the stepped portion side through splines 67 and supports at the outer periphery the second transmitting members 14, which are biased toward the second ratchet teeth 52 through a spring 19.

The relay member 63 is disposed between the driving member 4 and the gear frame 62 and is supported rotatably and axially slidably to the hub shaft 2. Splines 68 engageable with the splines 41 are provided at the outer periphery of one axial end of relay member 63 at the driving member 4 side thereof to thereby allow the relay member 63 to rotate in association with the driving member 4. The third transmitting members 15 are pivoted through pivot shafts 20 to the other axial end of relay member 63 at the gear frame 62 side and are by springs 21 toward the inner teeth 66 at the gear frame 62.

At an axially intermediate portion of hub shaft 2 is provided a radially perforating guide bore 22, and an axially perforating through bore 23 is provided across the through bore 22 and the axial end of hub shaft 2 at the bearing 11 side thereof.

Also, the speed changing means comprises an operating rod 24 inserted slidably into the axial through bore 23 at the hub shaft 2, a speed change key 25 in association with the operating rod 24 and supported slidably to the guide bore 22, and an actuator 28 to be discussed below.

In the aforesaid embodiment of the speed change hub of the invention constructed as described above, the relay member 63 is formed of a smaller diameter cylinder 63a supported to the hub shaft 2 and having at its outer periphery the splines 68 and a larger diameter cylinder 63c extending axially from one axial end of smaller diameter cylinder 63a through a radially stepped portion 63b and supporting the third transmitting members 15. At the outer periphery of stepped portion 63b at the relay member 63 is provided a first clutch 26 engageable with an operating portion 12a at each first transmitting member 12 to control the engagement or disengagement of first transmitting members 12. Speed change key 25 rotatably supports a cylindrical actuator 28 having a second clutch 27 engageable with the operating portion 15a at the third transmitting members 15, and between the actuator 28 and the relay member 63 is provided a transmitting means comprising an elastic member 29, such as a spring, for transmitting the sliding motion of actuator 28 to the relay member 63 after the third transmitting members 15 disengage from the gear frame 62, so that the relay member 63 slides after the second clutch 27 disengages the third transmitting members 15, and the first transmitting members 12 are caused to disengage from the hub shell 5 by the first clutch 26.

The actuator 28 is cylindrical, has at its inner periphery a stepped portion 28a, and is provided at the outer periphery of one of its axial ends with the second clutch 27 for allowing the third transmitting members 15 to descend in the disengaging direction from the inner teeth 66. Stepped portion 28a engages with a projection 25a at the speed change key 25, so that the actuator 28 is biased to the projection 25a through the elastic member 29 to thereby axially slide the actuator 28 integrally with the speed change key 25.

Figure 2:
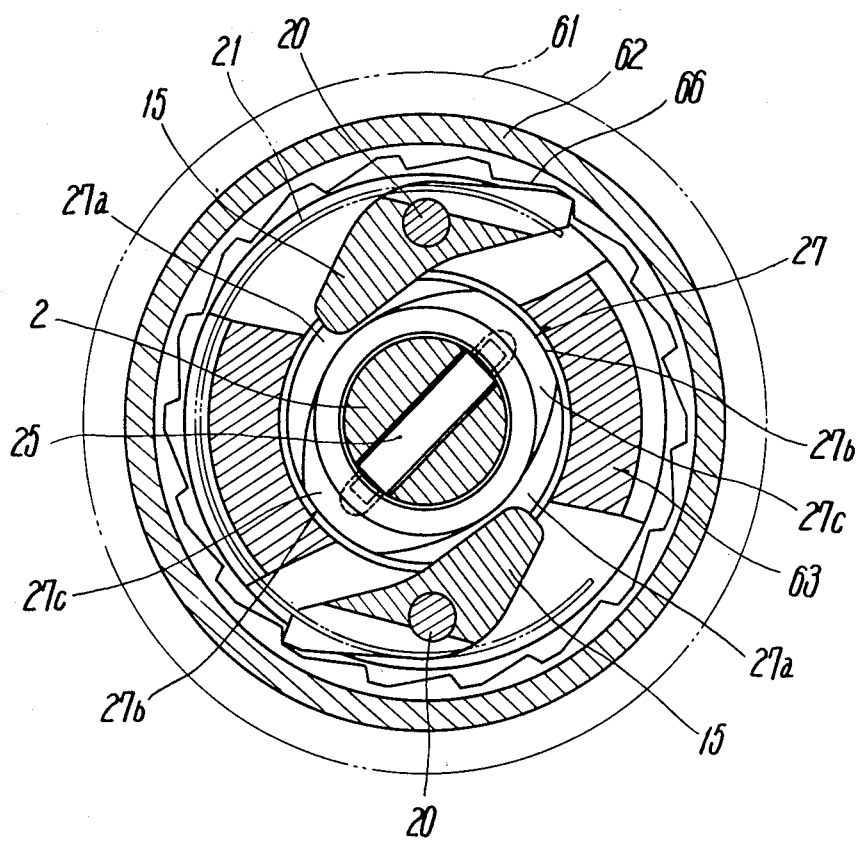
FIG. 2 is a partially omitted enlarged longitudinal sectional view of the FIG. 1 embodiment, which is taken at a third transmitting member.
Figure 3:
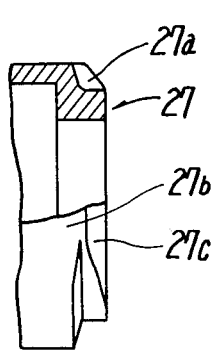
FIG. 3 is a partially cutaway view of a second clutch.
Figure 4:
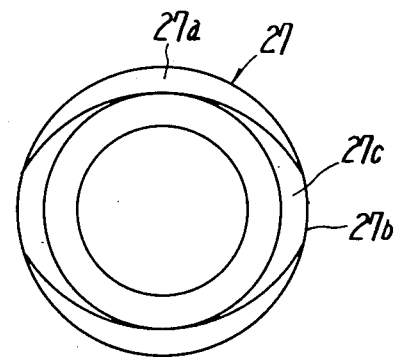
FIG. 4 is a side view thereof.

The second clutch 27, as shown in FIGS. 2 to 4, comprises a pair of receiving portions 27a of circular arc shape, for receiving the operating portions 15a at the third transmitting members 15. Second clutch 27 also comprises holding portions 27b comprising circular surfaces engageable with the operating portions 15a to hold the third transmitting members 15 in a disengagement position and a pair of guides 27c for guiding to the holding portions 27b the operating portions 15a received in the receiving portions 27a while being disengaged by rotation of relay member 63 with respect to the hub shaft 2. Receiving portions 27a are provided radially inwardly from the holding portions 27b to enable them to receive operating portions 15a in engagement with the inner teeth 66. Guide portions 27c have a circular arc shape and are slanted axially outwardly, so that when the third transmitting members 15 rotate together with the relay member 63 with respect to the hub shaft 2 in condition of keeping the operating portions 15a in the receiving portions 27a respectively, the operating portions 15a shift from the receiving portions 27a to the guide portions 27c and further to the holding portions 27b therefrom, thereby enabling the third transmitting members 15 to be kept in a disengagement condition.

The elastic member 29 constitutes a transmitting means to transmit the sliding motion of actuator 28 to the relay member 63 and is provided between the end face of actuator 28 and the stepped portions 63b at the relay member 63.

Between the one axial end of relay member 63 at the driving member 4 side thereof and the hub shaft 2 is interposed through a pair of washers 31 and 32 an elastic member 33 which applies a biasing force against that of elastic member 29 to thereby bias the relay member 63 toward the gear frame 62.

In addition, the speed change hub shown in FIG. 1 is provided in the hub shell 5 with a braking mechanism A which, when the driving member 4 reversely rotates, operates to stop the rotation of hub shell 5. Braking mechanism A comprises a one-way cam face 34 provided at the outer periphery of the smaller diameter portion of the first cylinder 621 of gear frame 62, rollers 35 engageable therewith, brake shoes 36 interposed between the rollers 35 and the inner periphery of hub shell 5, and a brake cone 37 to restrain rotation of each brake shoe 36 while permitting radial displacement thereof only.

Referring to FIG. 1, the speed change hub of the invention is shown in a high speed mode in which the first transmitting members 12 engage with the first ratchet teeth 51, the second transmitting members 14 engage with the second ratchet teeth 52, and the third transmitting members 15 engage with the inner teeth 66 at the gear frame 62. In this mode, the driving force transmitted to the driving member 4 is transmitted to the hub shell 5 through the relay member 63, third transmitting members 15, gear frame 62, planetary gears 13, ring gear 61 and first transmitting members 12, thereby driving the hub shell 5 at high speed.

When the high speed mode is intended to be switched to the middle speed mode or the low speed mode, the operating rod 24 is pushed to slide the actuator 28 toward the driving member 4 against the spring 29 and the operating portion 15a at each third transmitting member 15 enters into the receiving portion 27a at the second clutch 27. In this condition, the rotation of relay member 63 with respect to the hub shaft 2 allows the operating portion 15a to shift from the receiving portion 27a to the guide portion 27c and then to the holding portion 27b to thereby disengage the third transmitting members 15 from the gear frame 62. The third transmitting members 15 are kept in this disengagement condition to cut off the driving force to the gear frame 62, thus allowing the relay member 63 to be idle. Hence, the driving force from the driving member 4 is transmitted to the hub shell 5 through the transmitting pawls 9, ring gear 61 and first transmitting members 12, thereby driving the hub shell 5 at the middle speed in a condition of direct connection with the driving member 4. In this case, since the rotation of relay member 63 is used to rotate the second clutch 27 to disengage the third transmitting members 15 from the gear frame 62, a small operating force can be used to switch from the high speed mode to the middle speed mode, thereby improving the speed change efficiency.

When the operating rod 24 is further axially pushed, the idling relay member 63 slides toward the driving member 4 to engage at the first clutch 26 with the operating portions 12a at the first transmitting member 12, with the first clutch 26 disengaging the first transmitting members 12 from the hub shell 5 to thereby cut off the driving force thereto. As a result the driving force from the driving member 4 is transmitted to the hub shell 5 through the transmitting pawls 9, ring gear 61, planetary gears 13, gear frame 62 and second transmitting members 14, thereby driving the hub shell 5 at low speed.

Thus, the idling relay member 63 is slidable when switched to the low speed mode, so that a smaller operating force is used to effect a speed change from the high speed mode to the low speed mode, thereby improving the speed change efficiency to facilitate the speed change operation. In addition, the first clutch 26 need not be formed in as complex a construction as the second clutch, but can be very simple in construction.

Next, in a case where the low speed mode is switched to the middle or high speed mode, the operating rod 24 is operated leftwardly in FIG. 1 so that the elastic member 33 slides the relay member 63 toward the gear frame 62. When the operating rod 24 is operated by one stroke, the relay member 63 slides toward the gear frame 62, and the first transmitting members 12 disconnect the first clutch 26 and engage with the first ratchet teeth 51, thereby driving the hub shell 5 at middle speed.

Then, when the operating rod 24 is operated leftwardly further by one stroke, the actuator 28 slides away from the relay member 63 to thereby release the third transmitting members 15 and engage the same with the inner teeth 66 at the gear frame 62, thereby driving the hub shell 5 at high speed.

The relay member 63, during the above speed change operation, is subjected to an elastic force of elastic member 29 only so as to be kept idle, whereby the speed change from the low speed mode to the middle speed mode or to the high speed mode therefrom is performable with ease.

While an embodiment of the invention has been shown and described, the invention is not limited to the specific construction thereof, the specific illustrated embodiment being merely exemplary rather than defined.

What is claimed is:

1. A speed change hub for a bicycle, comprising:
a hub shaft, a hub shell supported rotatably relative to said hub shaft, a driving member supported by said hub shaft, a speed change gear mechanism for transmitting to said hub shell a driving force transmitted to said driving member, and a speed change operating means for operating said speed change gear mechanism, said speed change gear mechanism comprising a sun gear disposed on said hub shaft, a ring gear rotatable with said driving member and having first transmitting members for transmitting said driving force to said hub shell, a gear frame having planetary gears engageable with inner teeth of said ring gear and said sun gear and having second transmitting members for transmitting said driving force to said hub shell, and a relay member rotating with said driving member, having third transmitting members for transmitting said driving force to said gear frame, supported axially slidably relative to said hub shell, and having a first clutch for controlling said first transmitting members to cause them to engage or disengage relative to said hub shell responsive to sliding motion of said relay member, said speed change operating means comprising an operating rod supported slidably relative to said hub shaft and an actuator in operative engagement with said rod, said actuator having a second clutch for controlling said third transmitting members to engage or disengage relative to said gear frame, a transmitting means disposed between said actuator and said relay member, said transmitting means for transmitting sliding motion of said actuator to said relay member responsive to said second clutch controlling said third transmitting members to disengage from said gear frame, so that after said third transmitting members disengage, said relay member slides to cause said first transmitting members to disengage from said hub shell by operation of said first clutch, said second clutch comprising receiving portions for receiving therein said third transmitting members respectively, a holding portion having a substantially round surface for holding said third transmitting members in disengagement positions relative to said gear frame, and guide portions for guiding said third transmitting members to said holding portion while said third transmitting members are being controlled to disengage from said gear frame through rotation of said relay member with respect to said hub shaft.

2. A speed change hub for a bicycle, comprising: a hub shaft, a hub shell supported rotatably relative to said hub shaft, a driving member supported by said hub shaft, a speed change gear mechanism for transmitting to said hub shell a driving force transmitted to said driving member, and a speed change operating means for operating said speed change gear mechanism, said speed change gear mechanism comprising a sun gear disposed on said hub shaft, a ring gear rotatable with said driving member and having first transmitting members for transmitting said driving force to said hub shell, a gear frame having planetary gears engageable with inner teeth of said ring gear and said sun gear and having second transmitting members for transmitting said driving force to said hub shell, and a relay member rotating with said driving member, having third transmitting members for transmitting said driving force to said gear frame, supported axially slidably relative to said hub shell, and having a first clutch for controlling said first transmitting members to cause them to engage or disengage relative to said hub shell responsive to sliding motion of said relay member, said speed change operating means comprising an operating rod supported slidably relative to said hub shaft and an actuator in operative engagement with said rod, said actuator having a second clutch for controlling said third transmitting members to engage or disengage relative to said gear frame, a transmitting means disposed between said actuator and said relay member, said transmitting means for transmitting sliding motion of said actuator to said relay member responsive to said second clutch controlling said third transmitting members to disengage from said gear frame, so that after said third transmitting members disengage, said relay member slides to cause said first transmitting members to disengage from said hub shell by operation of said first clutch, said transmitting means comprising a first elastic member, and said speed change hub further comprising a second elastic member disposed between said relay member and said hub shaft, said second elastic member applying a bias force against said relay member in a direction substantially opposite to a bias force applied against said relay member by said first elastic member.

* * * * *